United States Patent [19]

Medrano, Jr.

[11] 3,929,544
[45] Dec. 30, 1975

[54] METHOD OF PRODUCING CONTINUOUS LENGTHS OF REINFORCED PLASTIC PIPE

[76] Inventor: Joseph Medrano, Jr., 14804 Daley Lane, Woodbridge, Va. 22191

[22] Filed: June 14, 1974

[21] Appl. No.: 479,402

Related U.S. Application Data

[62] Division of Ser. No. 290,601, Sept. 20, 1972, Pat. No. 3,837,970.

[52] U.S. Cl. ................................. 156/189; 156/195
[51] Int. Cl.² ............................................ B31C 13/00
[58] Field of Search ............ 156/173, 189, 190, 195, 156/429, 431, 432, 446

[56] References Cited
UNITED STATES PATENTS

| 1,674,171 | 6/1928 | Gammeter et al. | 156/195 |
| 2,887,721 | 5/1959 | Blanchi et al. | 156/432 |
| 2,943,729 | 7/1960 | Dalrymple | 156/429 |
| 3,325,327 | 6/1967 | Swan | 156/429 |
| 3,431,158 | 3/1969 | Poulsen | 156/173 |
| 3,441,459 | 4/1969 | Weidel | 156/195 |
| 3,519,520 | 7/1970 | Newman, Jr. | 156/431 |
| 3,682,746 | 8/1972 | Helmick et al. | 156/429 |

Primary Examiner—Douglas J. Drummond
Assistant Examiner—Basil J. Lewris
Attorney, Agent, or Firm—Nathan Edelberg; Robert P. Gibson; Vincent W. Cleary

[57] ABSTRACT

This invention is a method and apparatus for producing continuous lengths of reinforced plastic pipe from rolls of reinforced plastic tape wherein a special mandrel is employed. The pipe wall is built-up by winding tape about the mandrel and the wound piping is moved off the mandrel by means of a programmed axial movement of at least one mandrel section with a coordinated expansion and contraction of selected sections of the mandrel.

1 Claim, 4 Drawing Figures

METHOD OF PRODUCING CONTINUOUS LENGTHS OF REINFORCED PLASTIC PIPE

GOVERNMENT RIGHTS IN THE INVENTION

The invention described herein may be manufactured, used, and license by or for the Government of the United States of America without the payment of any royalties thereon or therefor.

DIVISIONAL APPLICATION

This application is a division of a co-pending patent application of Joseph Medrano, Jr. entitled: "Means and Apparatus for Producing Continuous Lengths of Reinforced Plastic Pipe," Ser. No. 290,601, filed 20 Sept. 1972, now U.S. Pat. No. 3837970.

BACKGROUND OF THE INVENTION

Heretofore, reinforced plastic pipe has been made by wrapping resin impregnated tape onto a mandrel and curing the tape wrapped mandrel in an oven by means of infrared or ultraviolet lights. In some prior art built-up tape systems, the cured tubing is removed, after curing, by a pull action and in one known prior art system, the tubing is continuously moved in one direction off the mandrel by means of an internally disposed continuous belt conveyor means which engages the inner surface of the tubing.

It will be recognized that the pull action prior art systems introduce mechanical difficulties which may result in damage to the tubing, thin wall tubing especially, as the gripping force necessary to remove the tubing from the mandrel may distort the configuration or break the tubing.

Likewise, it will be recognized that the internal conveyor devices, such as disclosed in U.S. Pat. No. 3,130,104 to T. P. Lewis, et al, are inherently restricted by conveyor size requirements to production of relatively large diameter pipe. In general, weight and other handling considerations often preclude the use of long lengths of larger diameter pipe in thick wall, high pressure applications. For example, long lengths of large diameter, high pressure pipe may be too heavy and otherwise cumbersome to be manufactured and installed in the field without the assist of large and expensive handling equipment.

Portable pipe manufacturing equipment suitable for producing long lengths of plastic pipe on site wherein the pipe is produced by an extrusion process are known, of course, but extruded plastic pipe is not recognized as suitable for high pressure applications.

It will be appreciated that prior art devices do not meet the need for relatively small diameter, high pressure built-up wall tubing where the number of junctions should be minimized. It is evident that a means for producing continuous lengths of small diameter piping for high pressure applications which is sufficiently portable for on site manufacture is not presently available and would be welcomed as a substantial advancement of the pipe manufacturing art.

SUMMARY OF THE INVENTION

The apparatus and method of producing continuous pipe of this invention incorporates a sectioned mandrel with each section expandable in a controlled time sequence to facilitate movement of the formed pipe off the end of the mandrel.

It is a primary object of this invention to produce long lengths of pipe with a minimum number of coupling interconnections.

It is a further object of this invention to provide a method and apparatus for producing plastic pipe which is adaptable to produce pipe of any desired diameter or wall thickness.

It is another object of this invention to provide a method and apparatus for producing continuous pipe at a controlled rate in an onsite field environment.

Reference is had to the following description of a preferred embodiment for a complete understanding of the invention and to the drawings wherein.

DESCRIPTION OF THE PREFERRED EMBODIMENT

Figure 1:
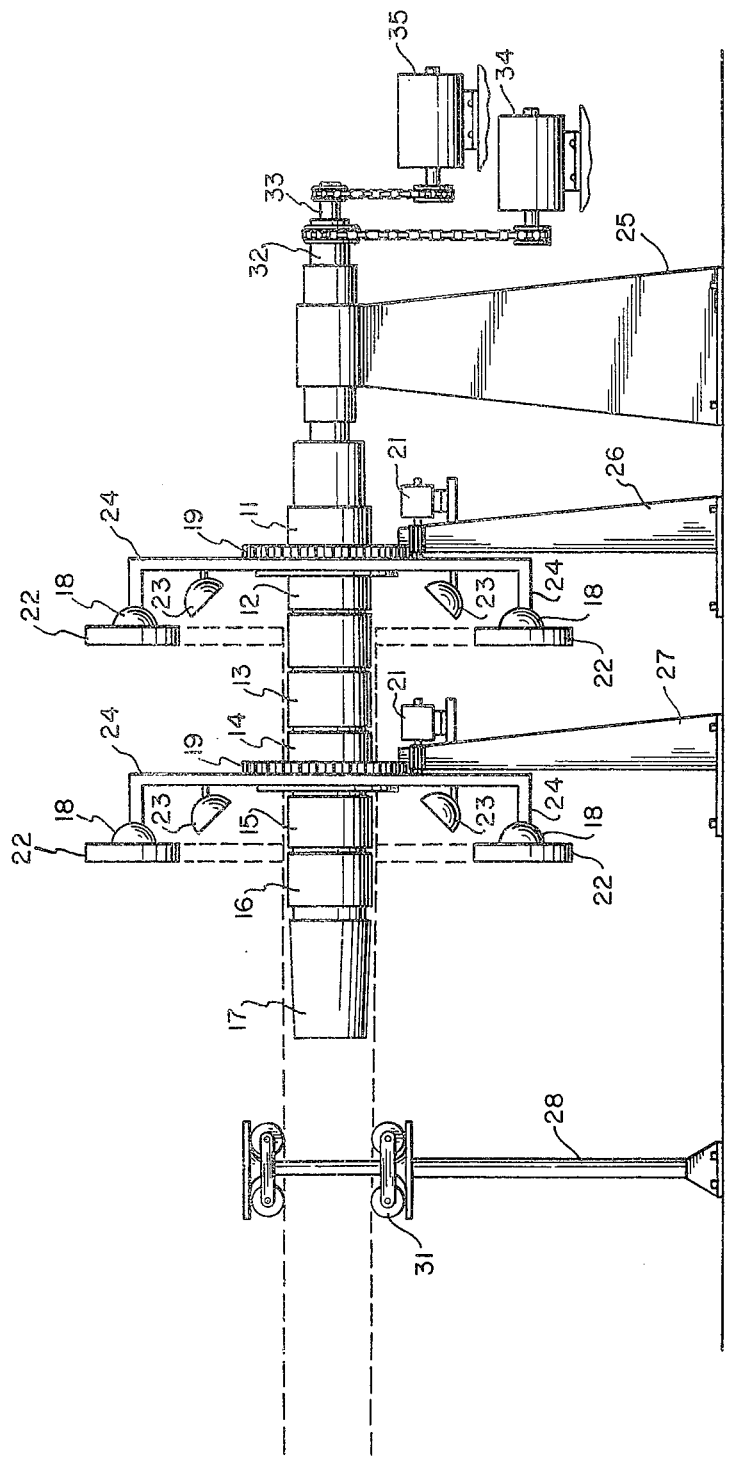
FIG. 1 depicts a typical pipe manufacturing apparatus in accordance with the present invention which is suitable for flatbed truck or trailer mounting.

FIG. 1 illustrates an apparatus for producing continuous lengths of conduit which is suitable for mobile platform mounting of the type required for field installation use. In the embodiment of FIG. 1, the mandrell 11 is sectioned along its axis as indicated at 12, 13, 14, 15, and 16 and has a slightly tapered end section indicated at 17. As will be described in detail hereinafter, each of the sections 12 through 16 are variable in circumference with respective expanded and contracted operational states in selected phase relation.

In accordance with the invention, four wrapping heads, indicated at 18, are adapted by gear means 19, or the like, to rotate about the axis of mandrel 11 as driven by motor means 21 or equivalent. Tape spool dispensing means 22 are mounted on the wrapping heads 18 to rotate thereon as the wrapping heads revolve about the axis of the mandrel and to dispense tape material at a discrete angle, for example 10 degrees, such that the tape is spiral wound about the mandrel in a lapped fashion. As will become apparent hereinafter, the wound tape piping is continuously moving axially as the tape is wound. Thus, the manner and nature of the spiral is determined by tape characteristics, tension of the tape as wound, angle of application, and the prescribed axial movement of the wound tape piping as the tape is wound.

It will be appreciated that the tape spool, wrapping head, and drive mechanism is shown in FIG. 1 in a relatively basic form. In view of the detailed tape winding presentation in the aforecited prior art U.S. patent to Lewis, et al, No. 3,130,104, and the recognized state of the art in winding techniques, no explicit winding operational dissertation is included herein. It is recognized, of course, that various prior art spiral winding techniques are adaptable to the apparatus of this invention and that the tape support and tape dispensing means may be other than as shown to accommodate such prior art winding techniques.

In the embodiment of FIG. 1 radiant lamp means 23 are mounted on the arm members 24 which support the wrapping heads 18 and are disposed and oriented such that radiant energy therefrom is directed to the spiral wound tape surface on the mandrel 11 for curing purposes. It will be recognized that various forms and intensities of radiant energy may be utilized to cure or harden the spiral wound tape surface on the mandrel 11 which constitutes the built-up layer pipe product of the apparatus of this invention. In essense, the particular tape and resin utilized, especially the catalyst ingredient, if any, determines the radiant energy selection. Thus, the placement of the radiant lamp means 23 may be other than as shown. For example, the radiant lamp 23 may be on other support means disposed at a point centered about the axis of the mandrel 11 but totally disassociated from the tape winding mechanism.

The apparatus depicted in FIG. 1 is provided with a mandrel support means 25 and two drive motor and wrapping head support means 26 and 27. An auxiliary mandrel support means 28 with roller support surfaces, indicated at 31, is provided to alleviate the torque force on the principal mandrel support means 25 as the product is produced. It will be appreciated that more than one auxiliary mandrel support means may be utilized to cradle the built-up layered tape product, if desired.

The unique mandrel 11 of the apparatus illustrated in FIG. 1 is internally controlled by means of concentric shafte 32 and 33 which are chain and sprocket driven, or the like, by drive motors 34 and 35 respectively, or the equivalent. It will be apparent hereinafter that by approprate pulley or gear relation, the drive motors 34 and 35 may in some instances be replaced by a single drive motors, if desired.

Figure 2:
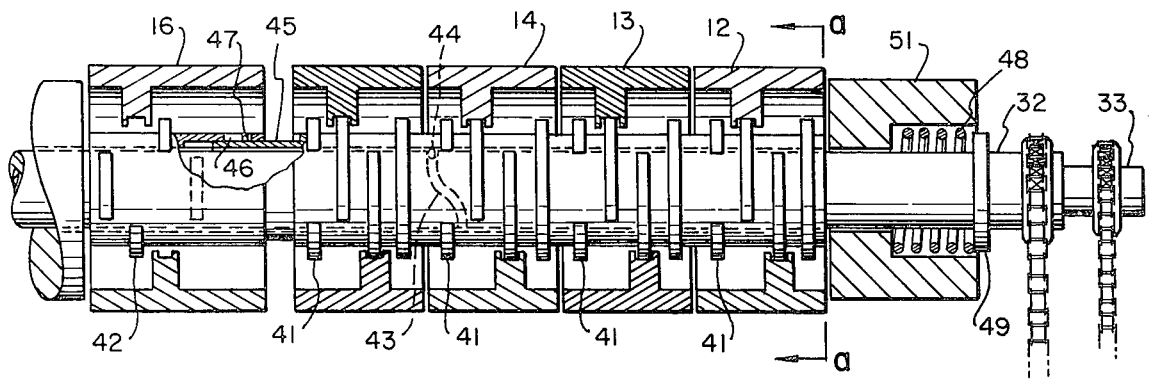
FIG. 2 is a cutaway view of the unique mandrel in the apparatus of FIG. 1.
Figure 3:
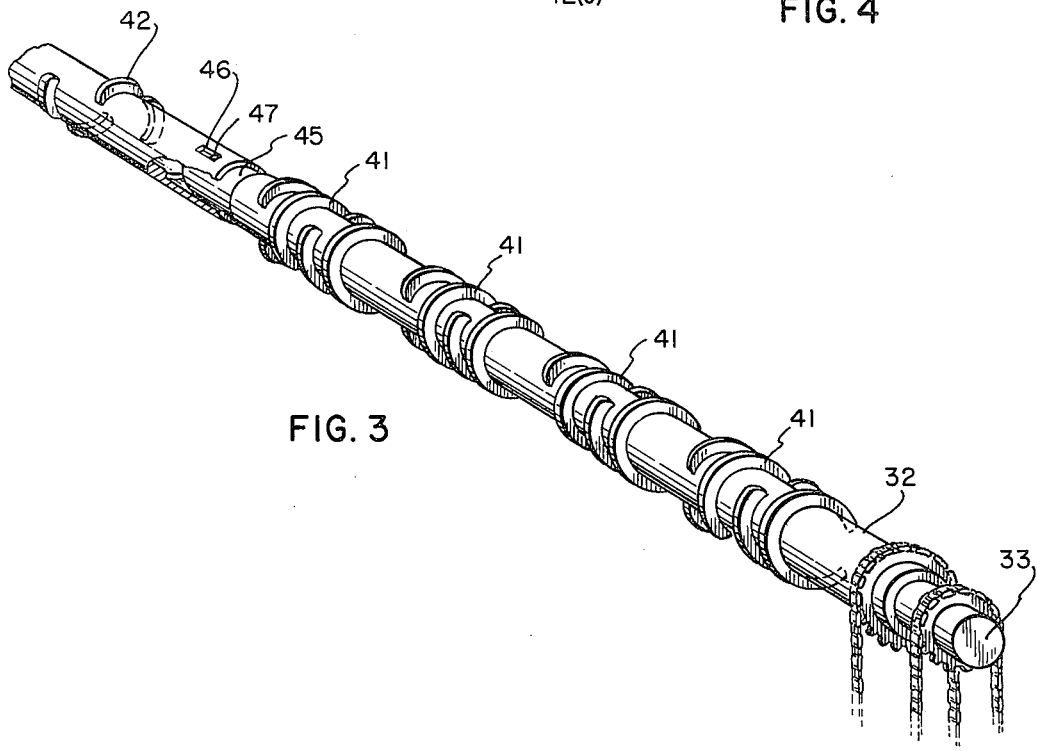
FIG. 3 is a more detailed showing of the principal mandrel drive shaft.

Referring now to FIG. 2, the unique axially sectioned mandrel of the apparatus shown in FIG. 1 may incorporate five variable circumference axial sections, as indicated at 12, 13, 14, 15 and 16. As more clearly shown in the cutaway view of FIG. 2, the circumference of each of the five sections is variable in accordance with the rotation of the internally disposed shaft 32 by means of a plurality of cams attached thereto indicated at 41 and 42, which are adapted to act upon each of the surface segments of each section simultaneously and in selected time relation with respect action upon other sections. FIG. 3 depicts the shaft 32 as a separate element to illustrate a typical disposition and relationship of the cams. It will be appreciated that in a normal cycle of operation the segmented sections 12 through 15 would be be expanded simultaneously. However, it may be advisable, dependent upon resin hardening and expansion characteristics of the wound tape to provide for differing rates of expansion between sections by variation of the cam configuration of each section and/or the disposition of the cams thereon.

In accordance with the invention the cams associated with section 16 may be attached to shaft 32, as indicated at 42, such that section 16 is expanded out of phase with respect the sections 12, 13, 14, and 15.

As shown in FIGS. 1, 2, and 3, the shaft 32 is hollowed and contains a drive shaft 33. In accordance with the invention, the centrally disposed drive shaft 33 is rotated concurrent with rotation of the shaft 32 and the two shafts are mechanically interconnected by means of a track and follower mechanism, or the like, such that the shaft 32, and associated cams 41, travels back and forth along the common axis as the shaft 33, rotates. For example, the inner surface of shaft 32 and the outer surface of shaft 33 may incorporate a slotted peripheral track 43 on one surface and a fixed position follower 44 on the other surface which is adapted to slide within the slotted track 43. In a typical embodiment, the track may follow a spiral, screw line, path in one direction with a constant increase for three-fourths of the circumference of the periphery and then the path may reverse direction and return to the point of origin in a relatively abrupt manner. For example, the constant increase in the reverse direction may be 3 time greater than in the initial portion of the path.

As previously described, the configuration of the slotted track 43 is so adapted and disposed to provide the longest term axial travel while the respective cams 41 expand the segmented sections 12, 13, 14, and 15 and to provide axial travel in the opposite axial direction while the cams 42 expand the segmented section 16.

It will appreciated that in the common shaft 32 embodiment depicted in FIGS. 2 and 3, the portion of the shaft with the cams 41 attached must be adapted to move axially with respect that portion of the shaft 32 with the cams 42 attached which is fixed in axial position. This may be accomplished as shown in FIG. 3 by a sleeve design, indicated at 45, incorporating a longitudinally slotted sidewall 46 and a fixed position follower 47, if desired.

Figure 4:
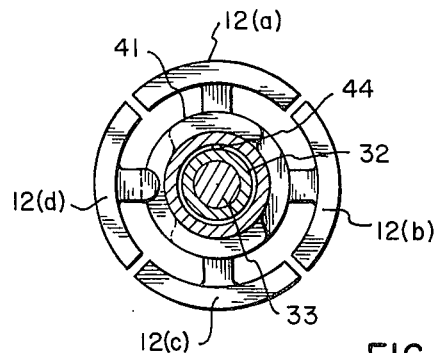
FIG. 4 is a cross sectional view of the mandrel taken on the line a-a in FIG. 2.

FIG. 4 is a cross sectional showing along the line a-a which illustrates the segment-cam relation in a typical variable circumference sections 12, 13, 14, and 15 wherein the rotary position of the drive shaft 32 determines the circumference of the section. It will be appreciated that the variable circumference may be segmented other than as shown. Obviously, in the illustrated segmented circumference embodiment, means for containing the segments in proper relation must be employed at least for the first wrap of the mandrel. For example, the segments might be contained by a thin resilient outer sleeve, not shown, or by internally disposed spring members, also not shown. Alternatively, a thin nonresilient sleeve member may be utilized. In this instance, of course, the sleeve member mass becomes a part of the end section of the built-up pipe. Furthermore, in selected applications with minimum variation in circumference, the outer surface of the mandrel may be made of resilient material, such as spring steel, with but one line of separation to permit expansion of the circumference. As shown in the embodiment of FIGS. 2 through 4, each cam is adapted to act on a respective segment and all cams associated with each segment are substantially identical in configuration and so disposed to vary the expansion of the circumference in a uniform manner. It will be appreciated that the cam configuration in FIG. 4 produces a full expansion of the circumference.

Similarly, the out-of-phase cam assembly associated with the segmented section 16, not shown, embodies a plurality of like cams but each cam has a configuration which produces a full expansion only during the approximately one-fourth of each full rotation of the shaft 32 when sections 12, 13, 14, and 15 are not expanded.

As shown in FIG. 2, the sections 12, 13, 14, and 15 are substantially contiguous to one another but the sections 15 and 16 are spaced a predetermined axial distance apart. This distance is determined by and is substantially the same as the axial distance progressed by the spiral track which mechanically interrelates the shafts 32 and 33. To further accommodate the uniform axial travel of the sections 12, 13, 14, and 15 toward the section 16, it has been found to be desireable to include a compression spring 48 which encompasses the concentric shafts 32 and 33 and is contained by the retainer ring 49 on the shaft 32 and the shoulder member 51 which in turn is adapted to apply pressure to the outside end of segmented section 12 in the direction of the segmented section 16 when said compression spring 48 is compressed by axial travel of segmented sections 12, 13, 14, and 15 toward said retainer ring 49. it will be appreciated that it is not essential in all applications of this invention to provide a compression means, as shown, and that the compression spring 48 may be omitted in some embodiments without adverse effect.

With full expansion of the circumference of mandrel sections, the highest friction resistant contact between the internal surface of the built-up tubing and the mandrel sections is obtained. It will be appreciated that the degree of friction resistance necessary to hold the built-up tubing in place at each stage of operation where such holding action is required is dependent upon tape material, tension of winding, mandrel section outer surface configuration, etc. Thus any high friction resistant contact within the degree necessary to hold in place would be suitable for the practice of this invention.

In a typical operational embodiment of the pipe making apparatus of this invention suitable for manufacture of a six inch pipe at a rate of one foot per minute utilizing 1½ inch wide prepreg tape, such as epoxy or polyester impregnated glass fiber tape, a four tape dispensing assembly, as shown in FIG. 1 may be operated to provide a layered wall pipe with a ½ inch overlap as follows:

Speed of rotation of shaft 32 — 20 RPM
Speed of rotation of shaft 33 — 8 RPM
Speed of rotation of tape dispensing assembly about mandrel — 12 RPM
Axial travel of sections 12, 13, 14, and 15 — 1 inch
Rate of axial travel of sections 12, 13, 14, and 15 in direction of section 16 — 1/12 inch per minute Obviously, the method and apparatus of this invention is adaptable to a variety of built-up wall piping and is not restricted to any particular number of tape layers nor to any particular size pipe nor to any particular rate of production thereof. It will be appreciated, in like manner, that the apparatus is not limited to the production of built-up wall piping utilizing the particular tape material disclosed herein. Thus, the subsequent processing of the built-up tape may be modified as appropriate and/or treatment may be incorporated in the actual winding process, if desired, without deviation from the general purview of this disclosure.

Moreover, the cross section configuration of the built-up wall may be other than circular, as shown, to meet peculiar pipe applications, provided of course, the cross section is uniform along the length of the piping and is adaptable to a rotary application of the tape material involving either rotation of the mandrel by means not shown and stationary wrapping heads or the rotation of the wrapping heads about the mandrel as shown.

I claim:

1. A method of production of built-up fiber reinforced plastic tubing on an elongated mandrel having a determined axis, where the tubing wall is built-up by layering and curing tape material of a variety having a cohesive characteristic, and the built-up tubing automatically moves off one selected end of the mandrel wherein:

the tape material is spirally wound, under selected tension, on a first variable circumference portion of said mandrel as said first portion of said mandrel continuously oscillates between an expanded first operational state and a relatively short term contracted second operational state, and said first portion periodically moves back and forth a selected axial distance as said first portion moves through each expansion-contraction cycle of operation;

the oscillation and axial movement of said first portion is synchronized such that said first portion is in said first operational state during the time period said first portion moves along its axis toward said selected end; and the axial movement of said built-up tubing is restrained as said first portion of said mandrel moves in the reverse direction along the axis of said mandrel; said built-up tubing being restrained by a second variable circumference portion of said mandrel located adjacent said selected end, said second portion being expanded when said first portion is in said second operational state so as to produce a high friction resistant contact between said second portion and the internal surface of said built-up tubing.

* * * * *